United States Patent
Riemenschneider

(10) Patent No.: US 9,588,525 B2
(45) Date of Patent: Mar. 7, 2017

(54) HOT WATER COOLING DEVICE FOR DRAINS

(71) Applicant: Cool Trough LLC, Grand Rapids, MI (US)

(72) Inventor: James E. Riemenschneider, Wyoming, MI (US)

( * ) Notice: Subject to any disclaimer, the term of this patent is extended or adjusted under 35 U.S.C. 154(b) by 298 days.

(21) Appl. No.: 14/317,670

(22) Filed: Jun. 27, 2014

(65) Prior Publication Data

US 2015/0185739 A1     Jul. 2, 2015

Related U.S. Application Data

(60) Provisional application No. 61/920,854, filed on Dec. 26, 2013.

(51) Int. Cl.
    *G05D 23/13*        (2006.01)
    *E03F 5/18*         (2006.01)

(52) U.S. Cl.
    CPC ............. *G05D 23/134* (2013.01); *E03F 5/18* (2013.01); *Y10T 137/0329* (2015.04)

(58) Field of Classification Search
    CPC .. G05D 23/13; G05D 23/1306; G05D 23/132; G05D 23/134
    USPC ............... 137/362; 236/12.1, 12.14
    See application file for complete search history.

(56) References Cited

U.S. PATENT DOCUMENTS

| | | | |
|---|---|---|---|
| 3,929,281 A | | 12/1975 | Woodward |
| 4,060,026 A | * | 11/1977 | Lohr ................. A47J 27/16 118/24 |
| 4,872,466 A | * | 10/1989 | Noren ............... A47L 15/0002 134/103.1 |
| 5,462,606 A | * | 10/1995 | Burns ............... A47L 15/0015 134/18 |

(Continued)

FOREIGN PATENT DOCUMENTS

| | | |
|---|---|---|
| CN | 201760245 U | 3/2011 |
| DE | 19504479 A1 | 8/1996 |
| SU | 1071692 A | 2/1984 |

OTHER PUBLICATIONS

ChampionMoyer Diebel, Field Installation Instructions for Drain Tempering Kit, Sep. 9, 2009, Champion Industries, Inc., pp. 1-4.*

(Continued)

*Primary Examiner* — Timothy L Maust
(74) *Attorney, Agent, or Firm* — Price Heneveld LLP

(57) ABSTRACT

A water-tempering apparatus reduces water temperature, to prevent overly-hot water from flowing into a drain. One disclosed apparatus includes a drain water tempering assembly that fits into the collection pan of a trough floor drain. The apparatus includes a valve, a cold water line connected to the valve, and a temperature control for causing the valve to open and dump controlled amounts of water into the over-heated water in order to cool the heated water to or below a legal-maximum predetermined temperature. A related apparatus includes portable tub with wheels and with temperature control components. A related method is also (Continued)

disclosed and claimed. The assemblies can be shaped for retrofit installation into an existing commercial drain, or can be for new installations, or can be a portable unit. The apparatus preferably uses non-electrical thermostat-operated control on a cold-water-supply valve.

9 Claims, 5 Drawing Sheets

(56) References Cited

U.S. PATENT DOCUMENTS

| | | | |
|---|---|---|---|
| 6,772,958 B1* | 8/2004 | Lamb | F01P 7/16 236/100 |
| 7,810,488 B2* | 10/2010 | Manganiello | A21B 3/04 126/20 |
| 7,971,601 B2* | 7/2011 | Lum | F16K 31/002 137/337 |
| 8,074,894 B2* | 12/2011 | Beagen | G05D 23/1346 236/12.1 |
| 8,733,666 B2* | 5/2014 | Beagen | F16K 31/002 236/12.1 |
| 2009/0039171 A1* | 2/2009 | Huang | G05D 23/022 236/93 R |
| 2013/0032224 A1 | 2/2013 | Andras et al. | |

OTHER PUBLICATIONS

Nick Tallos, The Importance of Drain-Water Tempering, Jul. 1, 2012, Therm-Omega Tech, Inc, 2 pages.*
International Search Report and Written Opinion of the International Searching Authority dated Nov. 27, 2014 (International Application No. PCT/US2014/045359).

* cited by examiner

HOT WATER COOLING DEVICE FOR DRAINS

This application claims benefit under 35 USC section 119(e) of provisional application Ser. No. 61/920,854, filed Dec. 26, 2013, entitled HOT WATER COOLING DEVICE FOR DRAINS, the entire contents of which are incorporated herein in their entirety.

BACKGROUND

The present invention relates sanitary drainage systems for kitchens, especially commercial kitchens where large volumes of very hot water may be sent to drain.

Kitchens and food preparation sites use large amounts of hot water in preparing food and when cleaning food processing equipment. However, the drained water itself must avoid adverse downstream effects on the environment. Thus, "sanitary drainage" must meet several plumbing codes/requirements, including that waste water shouldn't be discharged into a building drainage system at a temperature of greater than 140 degrees F. A problem is that many existing commercial drainage systems are not able to consistently satisfy this requirement and/or the drainage systems are very sensitive to employee control and cooperation. Also, it is desirable to provide a control system that does not add excessive cost to retrofit fixes, and that does not add considerable cost to new installations, and that in at least one form is retrofitable to an existing standardized system. Also, a control system is desired that is flexible and adaptable to different environments and that can be used within predetermined kitchen footprints without disrupting the food preparation and cleanup process.

SUMMARY OF THE PRESENT INVENTION

In one aspect of the present invention, a water-tempering apparatus is provided for reducing a temperature of heated water being sent to a floor drain assembly, where the floor drain assembly includes a collection pan for directing the heated water to a drain. The water-tempering apparatus comprises a drain water tempering assembly adapted to fit into the collection pan and including a valve, a cold water line connected to the valve, and a temperature control connected to the valve for causing the valve to open and dump controlled amounts of water into the heated water in order to cool the heated water to a temperature below a required predetermined temperature before being sent to the drain.

In another aspect of the present invention, a water-tempering apparatus is provided for reducing a temperature of heated water being sent to a floor drain assembly, where the floor drain assembly includes a collection pan for directing the heated water to a drain. The water-tempering apparatus comprises a valve, a cold water line connected to the valve, and a temperature control connected to the valve and having a temperature-sensitive portion extending into the drain for causing the valve to open and dump controlled amounts of water into the heated water in order to cool the heated water to a temperature below a required predetermined temperature before the heated water is sent to the drain.

In another aspect of the present invention, a method for reducing a temperature of heated water being sent to a floor drain assembly, where the floor drain assembly includes a collection pan for directing the heated water to a drain, comprises steps of providing a valve and a cold water line connected to the valve, and causing the valve to open and dump controlled amounts of water into the heated water in order to cool the heated water to a temperature below a required predetermined temperature before or as the heated water is sent to the drain.

In another aspect of the present invention, a water-tempering apparatus is provided for reducing a temperature of heated water being sent to drain. The apparatus includes a drain water tempering assembly having a portable tub with an outlet operably connected to a drain and including a valve, a cold water line connected to the valve, and a temperature control connected to the valve for causing the valve to open and dump controlled amounts of water into the heated water in order to cool the heated water to a temperature below a required predetermined temperature before being sent to the drain.

In another aspect of the present apparatus, a water-tempering apparatus for reducing a temperature of heated water being sent to drain comprises a portable tub defining a water holding area and an opening with hose for connection to a drain; a valve located adjacent a side of the tub for controlling cold water flow into the tub; a cold water line connected to the valve; and a temperature control connected to the valve and having a temperature-sensitive portion extending into the drain for causing the valve to open and dump controlled amounts of water into the heated water in order to cool the heated water to a temperature below a required predetermined temperature before the heated water is sent to the drain.

An object of the present invention is to provide a retrofitable unit that can be placed into a commercial drain to cool overly-heated water being sent to drain, in order to meet drain temperature limitations on commercial kitchens.

An object of the present invention is to provide a non-electrical unit that can be used in a commercial drain to cool overly-heated water being sent to drain, in order to meet drain temperature limitations on commercial kitchens.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
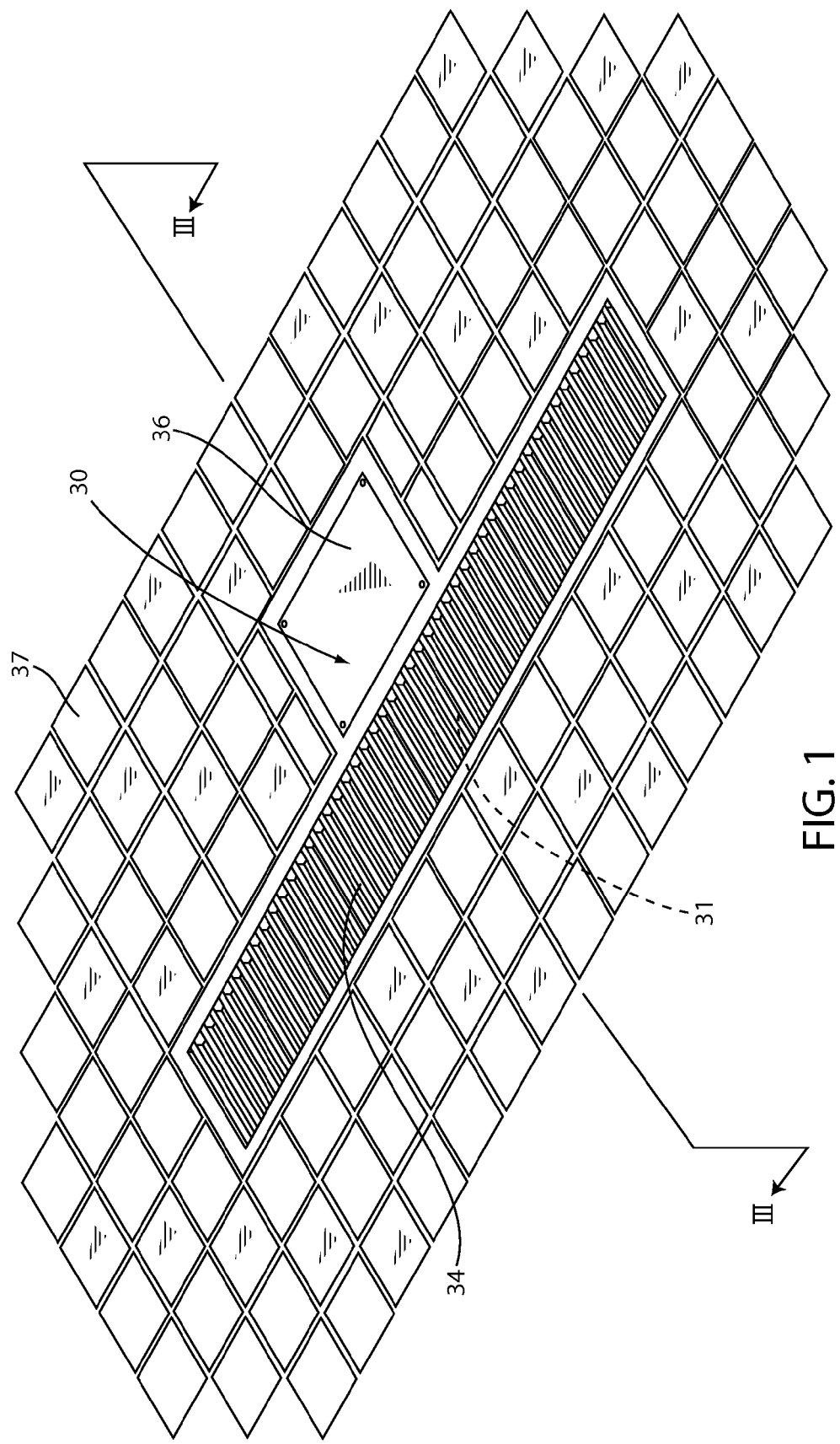
FIG. 1 is a perspective view of a commercial floor trench drain, including a non-slip grating and access cover, the water-tempering apparatus being located under the grating and cover as illustrated in FIGS. 3-4.
Figure 2:
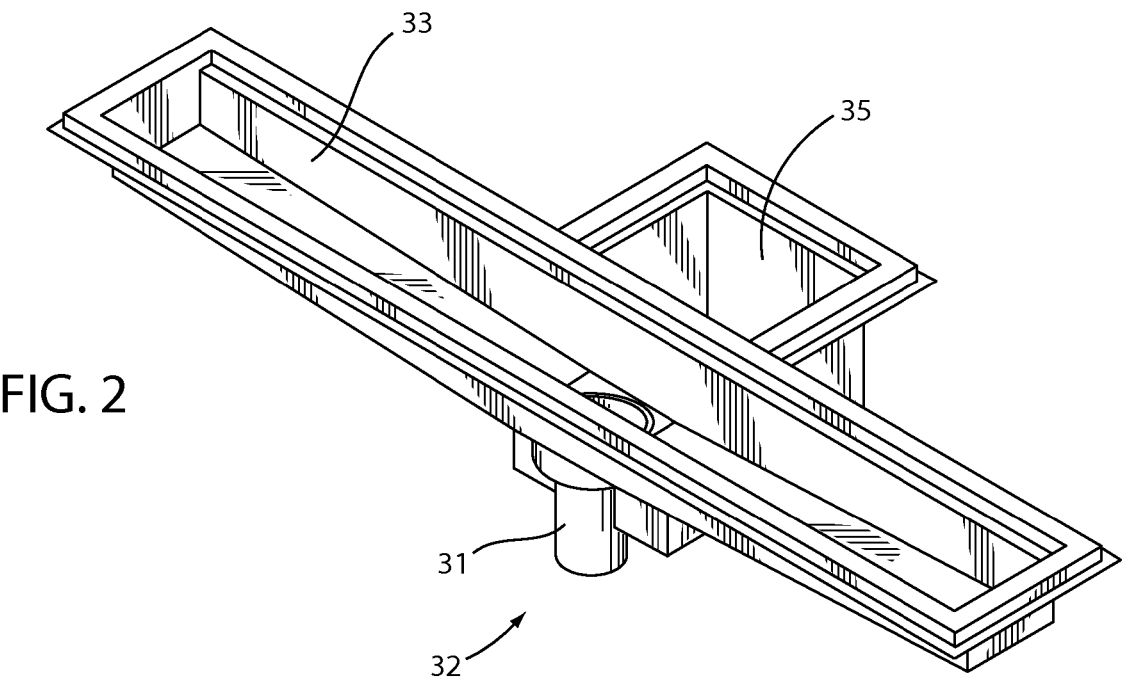
FIG. 2 is a perspective like FIG. 1 showing the trench drain, but with the grating and cover removed to show underlying structure (though it is noted that the water-tempering apparatus is hidden behind some walls of the trench drain in FIG. 2).
Figure 3A:
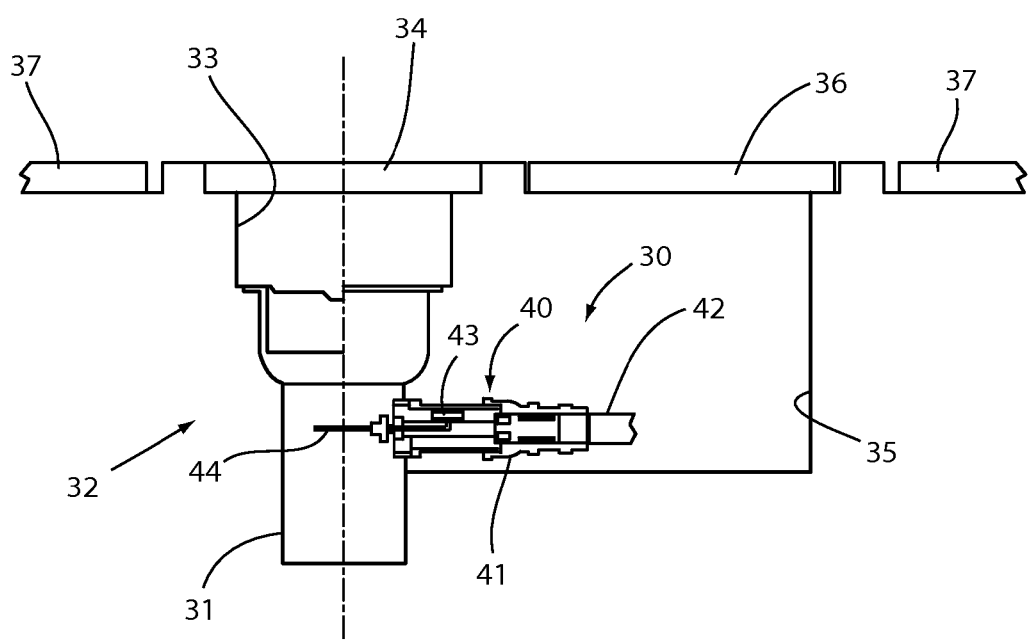
FIG. 3A is a cross section taken along lines III-III in FIG. 1.
Figure 3B:
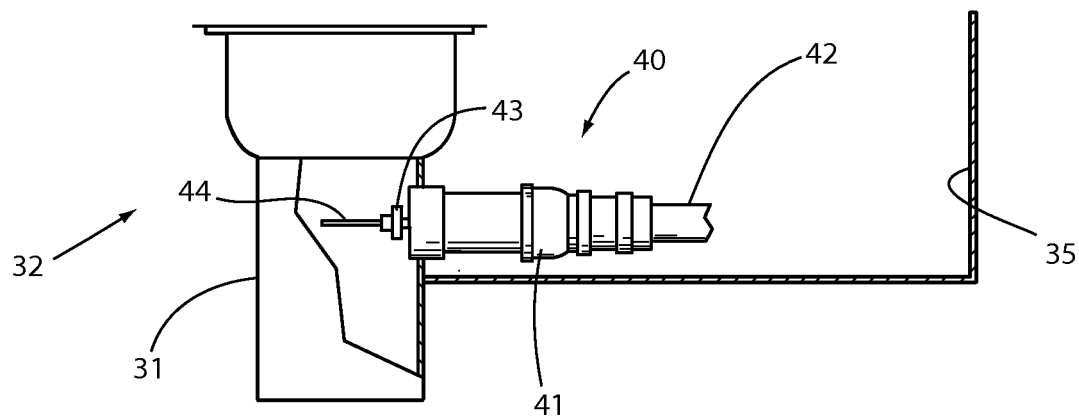
FIG. 3B is an enlarged view of a center area of FIG. 3A.
Figure 4:
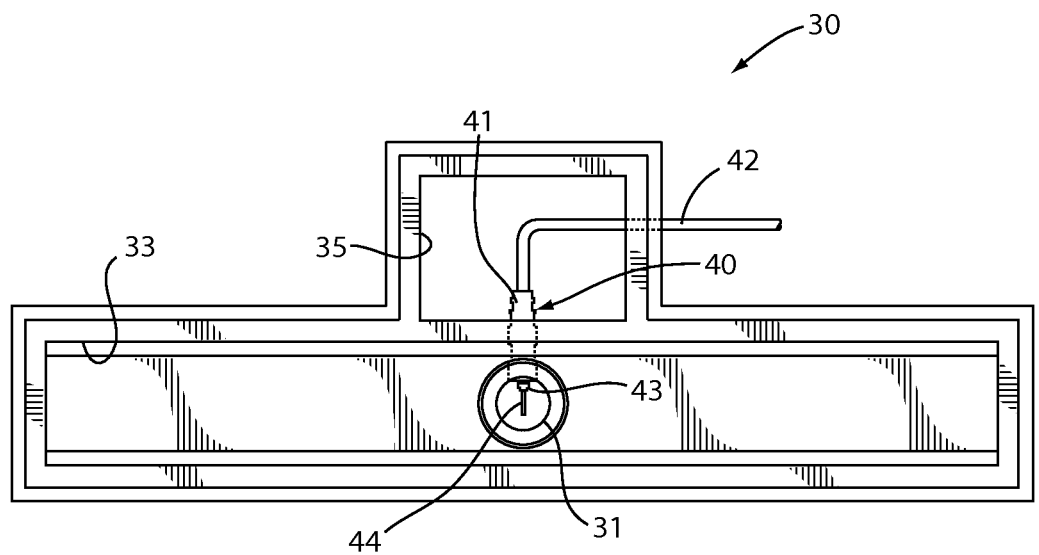
FIG. 4 is a plan view of FIGS. 2 and 3.

The present water-tempering apparatus 30 (FIGS. 1-4) is configured to reduce a temperature of "overly" heated water being sent to a floor drain 31. The illustrated apparatus 30 is configured to retrofitably fit into a trench floor drain assembly 32 connected to drain into the floor drain 31 (for collecting and draining water into the floor drain 31), which arrangement is often used for commercial kitchens. The present water-tempering apparatus 30 is made using non-electrical components, which greatly reduces complexity and cost of any such system, whether it is a retrofit system or a new installation. However, it is contemplated that the present innovation is not limited to only a retrofittable system, nor to a non-electrical system, nor to only commercial trench drain systems.

The illustrated floor drain 31 includes a collection pan 33 for collecting and directing heated water to the drain 31. It is noted that waste hot water is often generated by commercial kitchen equipment either when it is being cleaned or during operation. One such example would be a tip-drainable heating kettle. A removable non-slip grating 34 covers the collection pan 33. An access pan 35 (also called "access compartment") is positioned on a side of the collection pan 33 and covered using a cover 36. The grating 34 and cover 36 are coplanar with adjacent floor tile 37 and are sufficiently structural so that they will support a person stepping on them and/or walking across them and will support wheeled equipment being moved across them.

The apparatus 30 includes a drain water tempering assembly 40 adapted to fit into the collection pan 33. The drain water tempering assembly 40 includes a valve 41, a cold water line 42 connected to the valve 41, and a temperature control 43 (such as a mechanical temperature-activated thermostat) connected to the valve 41 for causing the valve 41 to open and dump controlled amounts of cold water into the heated water in order to cool the heated water to a temperature below a required predetermined temperature (such as below 140 degrees F.). It is contemplated that persons skilled in this art will understand that valves 41 and temperature controls (43) are commercially available, such that a detailed description of those components is not required in this document. The illustrated valve 41 and control 43 are integrated, so that when installed, a temperature probe 44 on the control 43 extends into the drain 31 (or into a desired location in the collection pan 33), and with the actuator of the control 43 extending to the valve 41. A cold water supply line 42 is connected to the supply-side of the valve 41. As illustrated, the valve 41 and supply line 42 are primarily located in the access pan 35 where they can be easily seen and serviced. However, it is contemplated that the valve 41, control 43, and supply line 42 can be positioned anywhere required by a particular installation.

As noted above, the assembly 40 can be a retrofitable unit shaped for placement into an existing commercial drain, but it is noted that it also can be made/used for new building or kitchen constructions/installations. Significantly, the assembly 40 can also be made using a non-electrical thermostat-operated control on a cold-water-supply valve, which makes the assembly relatively low cost and mechanically simple. Notably, the present arrangement not totally unlike a thermostat in a vehicle cooling system, where radiator fluid is only allowed to flow when the cooling fluid's temperature is at a desired temperature. But of course, the present assembly only allows cold water to flow when the existing drain water has too high of a temperature.

Modification

Figure 5:
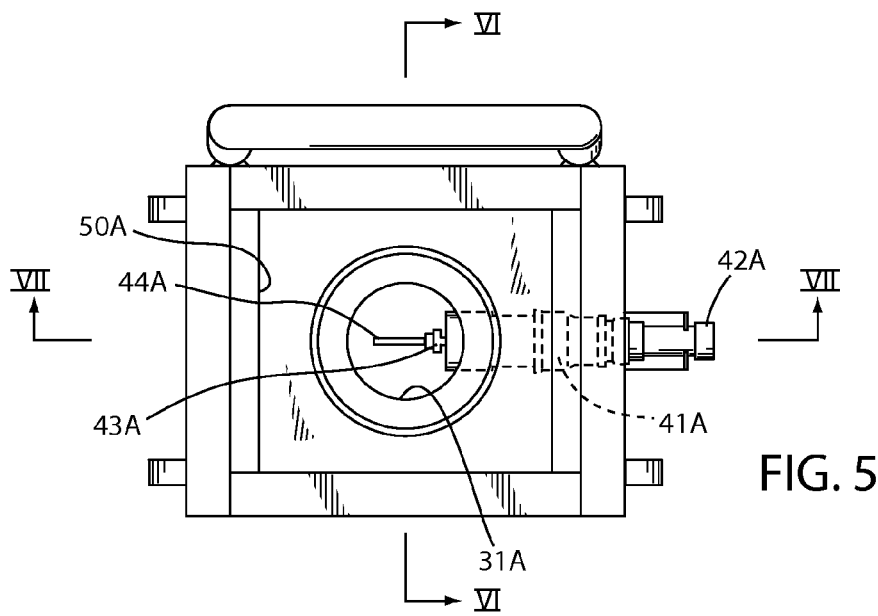
FIGS. 5-7 are orthogonal side, front and top views of a modified drain-water-tempering apparatus, the apparatus being portable and including a portable wheeled holding tub and drain-water-tempering control components.
Figure 6:
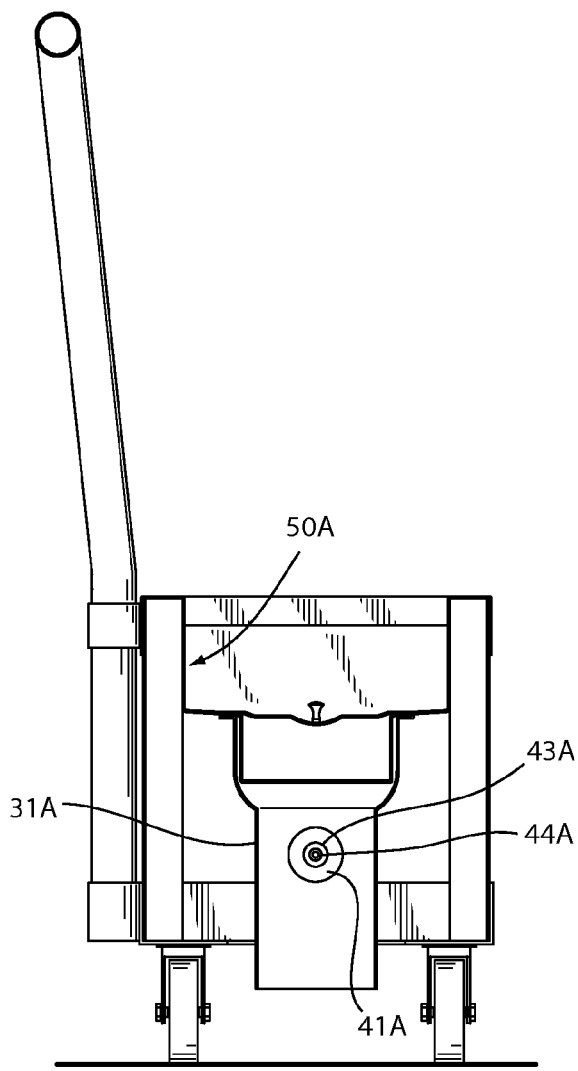
Figure 7:
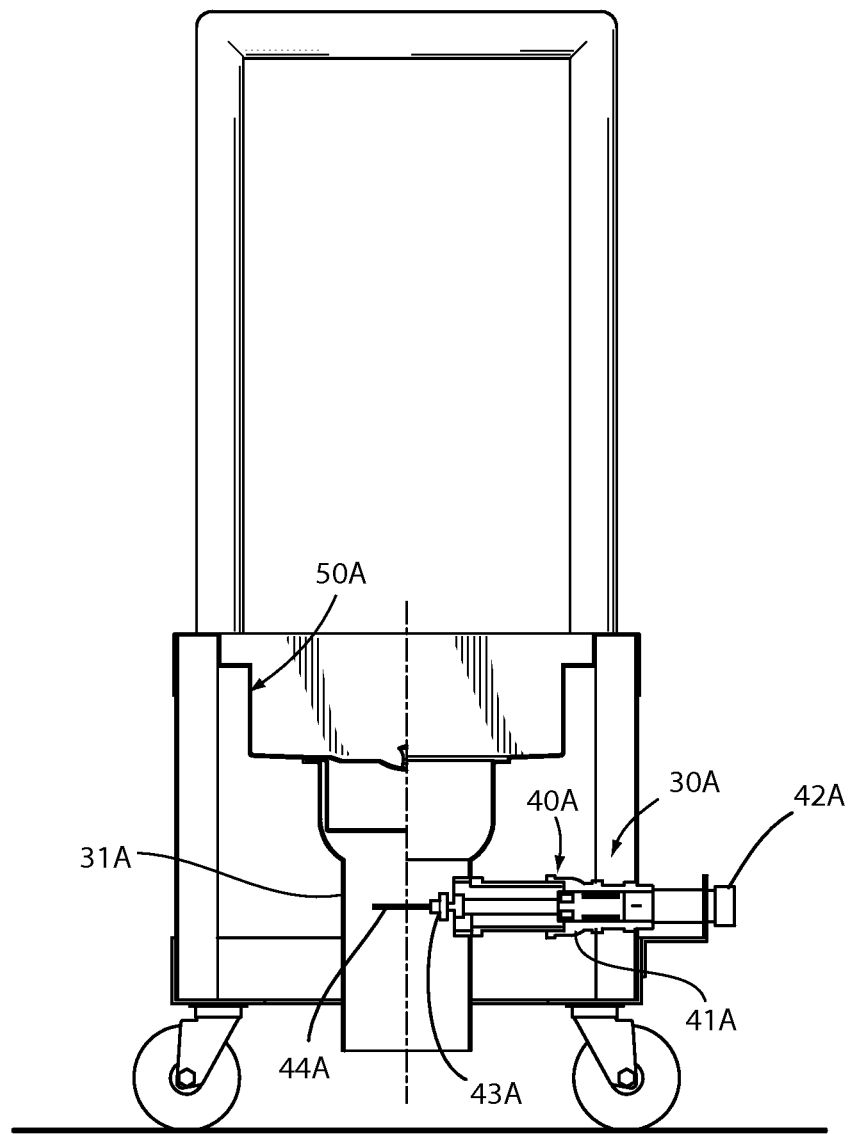

A modified version of the apparatus 30 is provided kitchens and food-preparation sites not adapted with a floor trough drain, or that for other reasons require additional flexibility of a portable drain system. Since the modified drain-water-tempering apparatus 30A (FIGS. 5-7) is portable, it allows for temperature-controlled drain water even in locations not able to accommodate the apparatus 30. In apparatus 30A (FIGS. 5-7), similar components to apparatus 30 are identified using the same numbers, but with the addition of the letter "A". This is done to reduce redundant discussion and not for another purpose.

The modified apparatus 30A includes the same basic components as apparatus 30, but apparatus 30A also includes a tub on wheels (or that is otherwise movable and not anchored to the floor). The tub 50A can be similar in shape (or larger than) to a trench floor drain assembly 32, or can be a different shape, as long as it is capable of receiving the drain water assembly 40A and capable of supporting the function of adding cool water to overly-hot water during a draining process.

The drain water tempering assembly 40A is adapted to fit into and be attached to a side wall of the tub 50A in a sealed leak-free manner, with its temperature control component 43A extending inside the tube 50A. Specifically, the drain water tempering assembly 40A includes a valve 41A, a cold water line 42A connected to the valve 41A (such as by using a rubber hose from a cold water source), and a temperature control 43A (such as a mechanical temperature-activated thermostat) connected to the valve 41A. The control 43A is configured to cause the valve 41A to open and dump controlled amounts of cold water into the heated water in order to cool the heated water to a temperature below a required predetermined temperature (such as below 140 degrees F.). The illustrated valve 41A and control 43A are integrated, so that when installed, a temperature probe 44A on the control 43A extends into the drain 31A (or into a desired location in the tub 50A), and with the actuator of the control 43A extending to the valve 41A. As illustrated, the valve 41A and supply line 42A are located where they can be easily seen and serviced. However, it is contemplated that the valve 41A, control 43A, and supply line 42A can be positioned anywhere required by a particular installation. A drain hole is formed in a bottom of (or at one end of) the tub, and a hose extended from the drain hole to a suitable floor drain or depository location.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A combination comprising:
   a floor drain including a below-the-floor-surface collection space for directing heated water to a below-floor drain; and
   a drain water tempering assembly including an access pan fit into the collection space and including a valve mounted to the access pan adjacent the collection space and located below the floor surface, a cold water line connected to the valve, and a temperature control connected to the valve for causing the valve to open and dump controlled amounts of water into the heated water in order to cool the heated water to a temperature below a required predetermined temperature before being sent to the below-floor drain.

2. The combination of claim 1, wherein the temperature control comprises a non-electrical device.

3. The combination of claim 2, wherein the temperature control comprises a heat-sensitive thermostat.

4. A portable water-tempering apparatus for reducing a temperature of heated water dumped by food-preparation equipment into a floor drain consisting of:
- an open-top portable tub including wheels, and also including a collection pan and an access pan with a dividing wall separating the collection pan and access pan;
- a valve attached to the dividing wall and extending toward the access pan;
- a cold water line connected to the valve; and
- a temperature control connected to the valve and having a temperature-sensitive portion extending into the collection pan for causing the valve to open and dump controlled amounts of water into the heated water in order to cool the heated water to a temperature below a required predetermined temperature before the heated water is sent to the floor drain.

5. The apparatus of claim 4, wherein the temperature control includes a non-electrical thermostat.

6. The apparatus of claim 4, including an above-the-floor tub holding the apparatus.

7. The apparatus of claim 5, including wheels on the tub.

8. A water-tempering apparatus for reducing a temperature of heated water being sent to a floor drain, where the floor drain defines a water-collection space for directing the heated water to sub-floor drain system, comprising:
- a drain water tempering assembly adapted to fit into the water collection space and including a collection pan and an access pan divided by a wall; and further including a valve in the access pan and supported by the wall, a cold water line connected to the valve, and a temperature control connected to the valve and extending into the collection pan and drain for causing the valve to open and dump controlled amounts of water into the heated water in order to cool the heated water to a temperature below a required predetermined temperature before being sent to the floor drain.

9. In a water-tempering apparatus for reducing a temperature of heated water being sent to a floor drain, where the floor drain includes a collection pan for directing the heated water to a below-floor drain system and an access pan adjacent the collection pan, an improvement comprising:
- a drain water tempering assembly constructed to fit into the access pan and that includes a wall separating the access pan from the collection pan, a valve mounted to the wall and extending toward an access-pan side of the wall, a cold water line connected to the valve, and a temperature control connected to the valve and extending toward a collection-pan side of the wall for causing the valve to open and dump controlled amounts of water into the heated water in order to cool the heated water to a temperature below a required predetermined temperature before being sent to the below-floor drain system.

* * * * *